Patented Sept. 4, 1945

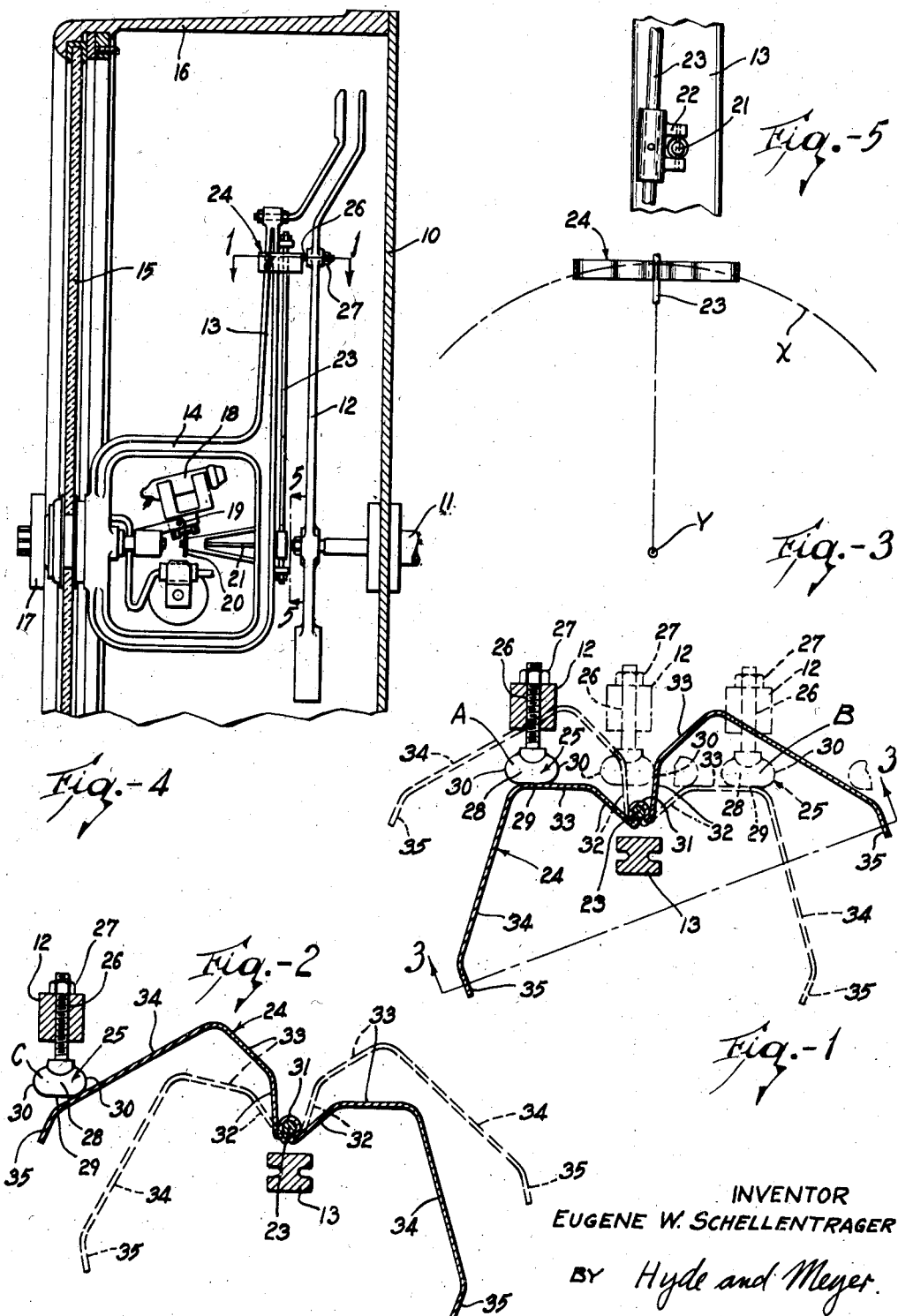

2,384,345

UNITED STATES PATENT OFFICE 2,384,345

TRIP DEVICE FOR SCALE MECHANISM

Eugene W. Schellentrager, Shaker Heights, Ohio, assignor to The Atlas Bolt & Screw Company, a corporation of Ohio Application July 24, 1943, Serial No. 496,035

2 Claims. (Cl. 200—56)

This invention relates to scale mechanism and more particularly to trip mechanism forming part of an auxiliary recording or control system used in connection therewith. The invention is an improvement upon that of my prior patent for Adjustable trip for scales, No. 2,304,024, granted December 1, 1942, to which reference may be had if desirable or necessary.

In said prior patent the mechanism includes two arms rotatable about a common axis, one arm being movable and actuated by the scale mechanism in accordance with the load thereon, and the other arm being relatively stationary, but manually adjustable to any position corresponding to a desired scale load. The two arms are cooperatively related by trip mechanism which is actuated, when the scale load has been increased to the desired value, for any suitable purpose, such as for controlling or operating an auxiliary system for making a record of the weight of the scale load, or for shutting off the flow of material from a bin gate or valve to the scale pan or receptacle, or for other purposes.

One object of the invention is to provide improved trip mechanism of the character described, which insures with certainty full and complete operation of the auxiliary control or other system of which it forms a part, without liability of failure on account of faulty operation due to vibration, impact, rebound or other causes.

A further object is to provide improved tripping mechanism of the character described, including means arranged upon trip actuation to maintain or lock the trigger in its new position for a sufficient length of time to insure operation of the auxiliary system for its intended purpose and thereby prevent false operations.

A further object is to provide improved tripping mechanism of the character described so arranged as to prevent the tripping parts from getting out of step with each other, or improperly related, as the result of their operation in ordinary use.

Still another object is to provide improved tripping mechanism of the character described, including resetting means which automatically restores the tripping parts to operative relation when for any reason they are or become improperly related, as will more fully appear.

Further objects of the invention are in part obvious and in part will appear more in detail hereinafter.

In the drawing, which represents one of the several possible suitable embodiments of the invention, Fig. 1 is a plan view of the tripping devices, with the arms to which they are attached shown in section on the line 1—1, Fig. 4; Fig. 2 is a similar view illustrating other positions of the parts; Fig. 3 is a sectional elevation on the line 3—3, Fig. 1, looking in the direction of the arrows; and Fig. 4 is a detail elevation, partly in section, showing a portion of the auxiliary control mechanism with which the tripping devices are associated; and Fig. 5 is a detail view taken on the line 5—5, Fig. 4.

Referring first to Fig. 4, 10 represents the dial of scale mechanism, most of which is not shown, but which includes a rotatable shaft 11 passing through the dial and carrying an arm or pointer 12 which moves to various positions along the dial graduations and thereby indicates weight, as usual, in accordance with variations in the load upon the scale mechanism. This arm is the movable arm of a pair of arms, the second of which, marked 13, is relatively stationary, in the sense that when it has been set to any position, and the scale is being loaded, it remains immovable. However, it is manually adjustable to various positions, for which purpose it is made to turn about the axis of shaft 11. As shown, it is mounted upon a frame 14 having a portion extending through an opening in the glass window 15 of the scale door 16 and provided with a knob 17 on the exposed face of the window, by which the frame may be rotated and the arm 13 may be adjusted to any position corresponding to a desired scale load, by the manual effort of the operator.

Movably mounted in the frame 14 is a suitable controlling device, such as the mercoid or mercury electric switch 18, which may be oscillated between its two extreme positions by turning movement around an axis indicated at 19. This switch is operated by back and forth movement (from left to right or from right to left in Fig. 4) of the disk 20 on the inner end of a rod 21 connected at its outer end to a short arm 22 on a shaft 23 extending longitudinally of arm 13 and provided at its opposite end with a movable trigger trip member 24 arranged for actuation by a trip finger 25 mounted in cooperating relation with it at the proper position on the scale arm 12.

The trip finger 25 resembles a winged head bolt. It has a shank 26 extending through a threaded opening in the arm 12, by means of which it may be adjusted horizontally in said arm into proper cooperating relationship with the trigger device which it operates. It is also provided with a nut 27, by means of which it may be locked to said arm. Its operating end is formed as a winged or oval flat head 28 having a smooth end edge 29 and curved side edges 30.

The trigger device 24 is also of special form, best illustrated in Figs. 1 to 3 inclusive. It consists of a flat metal strip, say one-half of an inch wide and seven inches or more in length, made of fairly stiff, strong and relatively inflexible metal, such as hard brass. Its middle portion is bent into a loop 31 surrounding and rigidly secured to the shaft 23, as by soldering, riveting or the like. On either side of said loop the metal is bent back upon itself to form two abutment members 32, which diverge from each other along an acute angle of between 45° and 60°. These two abutment members correspond to the like members of the corresponding trigger device of my prior patent referred to. They are operated alternately, as the operating tripping finger moves back and forth, to adjust the switch from one to the other of its extreme positions, to open or close the switch.

In the present arrangement the trigger abutment members are provided with means, and the actuating tripping finger is so formed, that as the two tripping devices come into operating relationship, the trigger is thrown to a new position and is then positively prevented from returning or being returned to its original position by the effect of any outside influence, such as the vibration of the entire scale mechanism due to a heavy load flowing into the scale, or to a vibrating screen, or from effects of rebound, or anything of that kind. The maintaining or holding means, in the arrangement shown in the drawing, consists of extensions 33 at the ends of the abutments 32. These extensions are parts of the same metal strip as said abutments, but they are bent outwardly and diverge from each other on a more open or obtuse angle. In Fig. 1, the full lines represent the position of the two tripping devices 24, 25, just prior to the moment when the desired or predetermined scale load has been completed. In other words, the tripping devices are on the point of operation. It will be assumed that device 25, on the scale arm 12, in position A, is moving from left to right in Fig. 1. The left-hand abutment 32 is entirely out of the path of the head 28, while the right-hand abutment 32 extends into that path. Also, the left-hand maintaining extension 33 extends parallel to the direction of movement of the head 28 and lies alongside of its end edge 29. Consequently, as the head 28 continues its movement to the right from position A, in Fig. 1, its advance curved side edge 30 engages the right-hand abutment 32 and begins to move or turn the trigger 24 and shaft 23 on which it is mounted. The movement continues until the trigger has been thrown clear over to its second position, shown in dotted lines Fig. 1. Of course, the switch 18 has also swung to its second or new position. Now, as the head 28 continues to move, its end edge 29 travels along the surface of the right-hand maintaining extension 33, which now occupies a position corresponding to that of the left-hand extension, before trip operation began. The finger head 28, in position B, consequently, provides an obstacle which cooperates with the extension 33 to prevent the return of the trigger to its original position, and locks or holds it in its new position for a sufficient length of time to permit the mercury in the mercury switch to flow over to the other end of its tube and consequently open or close the switch, as the case may be. Thus, the extensions 33 serve as effective maintaining or locking means for preventing undue return of the trigger device, when it has once been thrown, until the mercury has moved over to the other end of its tube and has opened or closed the switch, as the case may be, and has thereby stabilized the switch in its new position.

It of course must be assumed that in the original set-up of the mechanism the two arms 12, 13, and the tripping devices thereon, are so set up with respect to the calibrations on the scale, and with reference to dribble, delay or time of operation of the gate of the bin from which the scale is being loaded, that the switch has opened or closed, as the case may be, and the bin gate has closed and dribble has ceased, when the scale pointer reaches a dial indication representing the exact load in the scale, or, in case the auxiliary system including the tripping devices and switch in this instance, actuates a recording device, when the record has been made.

The tripping devices shown also include means for resetting them with reference to each other, into proper cooperative relation, in case they ever are found or become in non-cooperative relation. For example, the scale door may be opened for inspection, cleaning or repair purposes, and the trigger device 24 may be turned to the wrong position with reference to the finger 25, at the time the scale door is closed. False operation is prevented, in that event, by resetting extensions 34, which are pieces of the same strip of metal extending outwardly from the ends of the maintaining extensions 33, and bent back, as shown, almost at right angles to the extensions 33. Their outer ends are bent again, slightly, as at 35.

Referring now to Fig. 2, the full lines show the trigger device 24 in its second position, to which it has been moved by the finger 25, when the scale load has been completed. Let it be assumed that with the scale empty, and with the scale pointer 12 at the zero position, the scale door is opened, and before it is closed the trigger device 25 has been moved to the position just referred to. Now, if a load is poured into the scale, as the pointer 12 moves away from the zero point, the head 28 of the finger 25, in position C, first engages the resetting extension 34, with a cam or wedge effect by which the head 28, by its advance movement, serves as an operator to forcibly turn the tripping device 24 in the counterclockwise direction, first to the dotted line position, Fig. 2, and finally to the full line position, Fig. 1, thus first restoring said trigger device and the switch and other parts connecting thereto to their normal cooperative relation with the finger 24. In actual operation, and depending to some extent upon the exact angles to which the parts 32, 33 and 35 are bent, the head 28 may engage either the extension 34 or the bent end portion 35 thereof. Also, as the trigger is turned by the wedge effect, the mercury of the switch begins to move and its momentum may complete the movement of both the switch and the trigger before the head 28 has traveled the full length of the extension 34. As the pointer movement continues, by the introduction of further load into the scale pan, the tripping devices now cooperate in the manner before described, the head 28 engaging the right-hand abutment 32 and turning the trigger and switch to their second positions, with operation of the auxiliary system in the proper way, as intended.

Thus, with this mechanism, should the tripping devices become out of step, either as the result of being so placed unwittingly when the scale door is opened, or even as the result of any faulty operation, the tripping devices are self-restoring or resetting to their normal operative relation, without injury to any part of the mechanism.

Fig. 3 illustrates how the arms of the trigger are made wide enough to conform them to the curved path of movement X of the finger 25 around the central axis Y. Proper proportioning of the parts insures their cooperative relation throughout their range of movement, as will be readily understood.

It should also be noted that the length of the head 28, from one of its curved side edges 30 to the other, is approximately the same as the spacing of the outer ends of the abutment members 32. In other words, as the head 28 moves back and forth and swings the trigger from one position to the other, said head substantially fills the mouth of the V-shaped recess between the abutment members, thus dispensing with lost motion and largely preventing possibility of rebound.

The tripping mechanism described satisfactorily meets two important objections to prior mechanism for the same purpose, as follows:

(1) It avoids any possibility of the trip finger on the scale arm moving past and beyond the trigger member without actual or effective operation of the auxiliary parts operated or controlled by the trigger. Heretofore, in some rare instances, the mercoid switch tube has swung over and then has returned to its original position before the mercury globule has reached the other end of the tube, thus permitting the bin gate to remain open and requiring emergency closing.

(2) Should the trip finger and trigger reach an out-of-step relation with each other, for any reason, they are self-setting or self-restoring to normal position. This avoids any possibility of injury of the trigger members or of any of the parts which it operates, as might occur when the parts get out of step in cases where the resetting means is omitted.

Other advantages of the invention will be apparent to those skilled in the art.

What I claim is:

1. In switch operating mechanism of the type including a switch member movable back and forth across dead center and biased by gravity toward one or the other of its two end operating positions and an oscillatable shaft operatively connected to said switch member, improved trip mechanism for operating said switch member, comprising cooperating finger and trigger members, said trigger member including two spaced arms attached to and extending outwardly from said shaft and adapted for swinging movement about the shaft axis back and forth from one to the other of two positions to alternately present said arms in said path to said finger for operation thereby, said finger member engaging said arms alternately to operate said switch by finger movement back and forth along said path from one to the other of two positions each beyond one of said arms to thereby pass the same during switch operation, said switch and its operating connections to said shaft being of such form and so mounted as to offer minimum opposition to switch actuation by said finger, each of said arms being provided with maintaining means cooperating with said finger and arranged when said arm has been engaged, actuated and passed by said finger to prevent undesirable return of the switch to its original position.

2. In switch operating mechanism of the type including a switch member movable back and forth across dead center and biased by gravity toward one or the other of its two end operating positions and an oscillatable shaft operatively connected to said switch member, improved trip mechanism for operating said switch member, comprising cooperating finger and trigger members, said trigger member including two spaced arms attached to and extending outwardly from said shaft and adapted for swinging movement about the shaft axis back and forth from one to the other of two positions to alternately present said arms in said path to said finger for operation thereby, said finger member engaging said arms alternately to operate said switch by finger movement back and forth along said path from one to the other of two positions each beyond one of said arms to thereby pass the same during switch operation, said switch and its operating connections to said shaft being of such form and so mounted as to offer minimum opposition to switch actuation by said finger, each of said arms being provided with a resetting end extension inclined to the arm at such an angle that, when the arm has been actuated and passed by said finger and then undesirably has been moved to an out-of-step relation with said finger by an operation other than reverse finger movement, said extension extends diagonally across said path of movement between the finger and the arm and serves as a cam for actuation by reverse finger movement to restore the arm to in-step relation with the finger.

EUGENE W. SCHELLENTRAGER.